Aug. 17, 1926.
E. T. WHATLEY
DETACHABLE COUPLING
Filed April 12, 1926
1,596,645
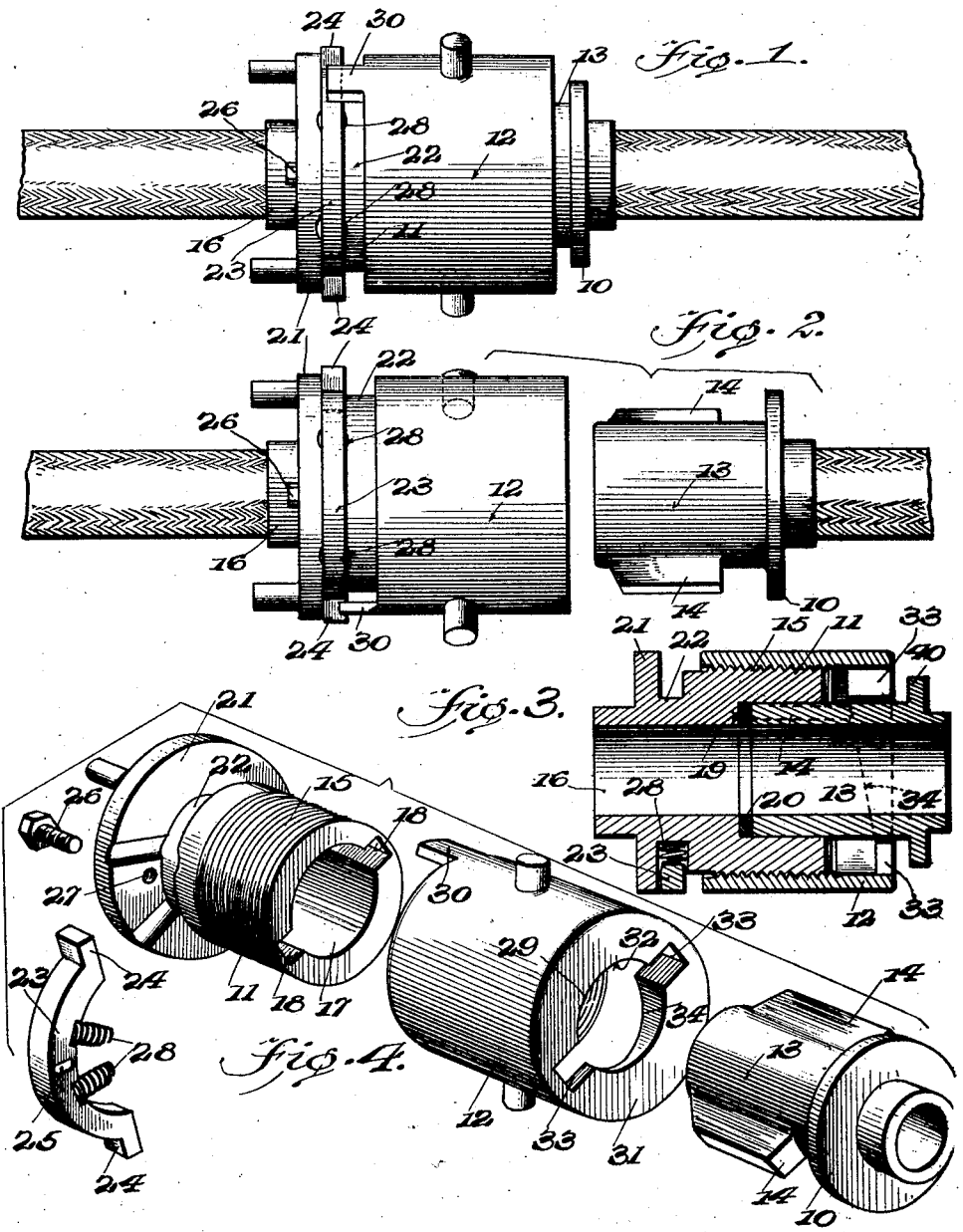
INVENTOR
Edgar T. Whatley,
BY
ATTORNEYS
WITNESSES Patented Aug. 17, 1926.

1,596,645

UNITED STATES PATENT OFFICE.

EDGAR T. WHATLEY, OF SAVANNAH, GEORGIA.

DETACHABLE COUPLING.

Application filed April 12, 1926. Serial No. 101,514.

My present invention relates generally to couplings for pipe, hose and other similar conduits, and is more particularly a detachable coupling having as its primary object the provision of a construction which will be simple and inexpensive and which will be especially easy to manipulate, permitting of quick attachment and detachment in practically one movement.

In the accompanying drawing, which illustrates my present invention and forms part of this specification:—

Figure 1 is a side elevation showing my improved coupling, the parts being in coupled position;

Figure 2 is a similar view, the parts being in released position with the male member of the coupling detached;

Figure 3 is a central longitudinal sectional view through the coupling with the parts in coupled position shown in Fig. 1, and, Figure 4 is a perspective view showing the several parts of the coupling in detached relation.

Referring now to these figures, my invention proposes a coupling which comprises male and female members 10 and 11 and a coupling sleeve 12, the male member 10 having a cylindrical body 13 provided adjacent to its free end with lengthwise ribs 14, outstanding therefrom in diametrically opposed relation.

The female member 11 has an externally threaded body 15 provided with a main bore 16 and a counter bore 17, and having within the counter bore diametrically opposed longitudinal grooves 18. The counter bore 17 is adapted for the reception of the body 13 of the male member of the coupling and forms between the same and the main bore an annular shoulder 19, as indicated in Fig. 3, adapted to receive a gasket or packing ring 20, which the end of the body of the male member abuts when the latter is extended into the counter bore with its ribs 14 in the grooves 18 of the female member.

The female member 11 is provided at its opposite end with a circumferential flange 21, and has adjacent to said flange an annular groove 22, the latter receiving an arcuate stop arm 23 having laterally deflected lugs 24 at its opposite ends. This stop arm has a central slotted opening 25 and is held in the groove by virtue of a pivot pin 26 threaded through an opening 27 in the flange 21. The arm 23 is moreover engaged by a pair of coil springs 28 arranged at opposite sides of its pivot opening 25 and having as an abutment the base of the groove 22. The arm 23 being spaced from the base of the groove is thus permitted to rock to a limited extent for a purpose which will be presently described.

The third part of the coupling, namely, the coupling sleeve 12, is cylindrical for the major portion thereof, and is internally threaded as at 29 for a portion of its length from one end so as to engage the threaded portion 15 of the body of the female member, and this coupling sleeve has at its end just referred to an endwise projecting lip 30 which in the rotative movements comes into engagement with the end lugs 24 of the stop arm 23.

At its opposite end the coupling sleeve is provided with an inturned annular flange 31 presenting a central opening 32, coinciding with the counter bore 17 of the body and diametrically opposed notches or recesses 33 coinciding with the grooves 18 of the female member, the inner surface of the flange 31 of the coupling sleeve being inclined between the recesses 33 to form cam faces indicated at 34 for engagement with the inner ends of the ribs 14 of the male member after the latter has been inserted through the opening 32 of the flange of the coupling sleeve and into the female member, as indicated in Fig. 3.

In the initial assembly of the parts the coupling sleeve is turned on to the female member and adjusted to the point where, upon insertion of the male member into the female member, through the flange of the coupling sleeve, the inner cam faces 34 of the coupling sleeve will engage the inner ends of the ribs 14 of the male member. The stop arm 23 is then assembled in connection with the female member in the manner previously described and in such a position that the projection 30 of the coupling sleeve engages one of the lugs 24, as indicated in Fig. 2. With the parts in this position, it is then simply necessary to shift the coupling sleeve rotatably until its lug projection 30 comes into engagement with the other stop lug and during this movement the cam faces 34 engaging the inner ends of the ribs 14 will force the male member lengthwise of the female member until the end of the male member engages and compresses the gasket or packing ring 20.

It is equally obvious that in order to detach the coupling parts it is simply necessary to reverse the foregoing movement of the coupling sleeve, whereupon the cam faces 34 of the latter will be shifted out of engagement with the ribs of the male member and the recesses 33 of the flange 31 of the coupling sleeve will be moved into registry with the grooves 18 of the female member, permitting the male member to be shifted outwardly and free of the female member and the coupling sleeve.

The coupling as thus described may be readily employed in connection with pipe and hose of various characters and more especially with tubular conduits of that nature where an easy, quick, attachable and detachable coupling is to be desired.

I claim:

1. A detachable coupling comprising a female member having a main bore and a counter bore at one end and provided with internal diametrically opposed lengthwise grooves along the counter bore, said female member having external threads, a coupling sleeve threaded on the female member and having adjacent to the counter bored end of the female member an internal annular flange forming an opening corresponding to and in line with the counter bore, and diametrically opposed recesses corresponding to and in line with the grooves of the female member, and a male member having a portion adapted to interfit the counter bore of the female member and having diametrically opposed longitudinal ribs along said portion adapted for movement inwardly beyond the end flange of the coupling sleeve, the inner surfaces of the flange of the coupling sleeve being inclined around its opening between its recesses whereby to form cam faces engageable with the ribs of the male member upon rotative movement of the coupling sleeve, the said coupling sleeve having an endwise projection, a member externally of the female member having stop lugs engageable by the projection of the coupling sleeve when the latter is in locked and released positions and a pivotal connection between said last named member and the female coupling member permitting the former limited movements upon engagement by the projection of the male member.

2. A detachable coupling comprising interfitting male and female members having engaging means preventing their relative rotation and including grooves of the female member and ribs on the male member, and a coupling sleeve threaded on the female member and having an internal flange at one end through which the male member is shiftable, presenting inner cam faces engageable with the ribs of the male member upon rotation of said sleeve to force the male member lengthwise of the female member, said coupling sleeve having an endwise projection at one end, an arcuate stop arm movably supported by and externally of the female member having laterally deflected stop lugs at its opposite ends in the path of rotative movement of the said projection of the coupling sleeve.

EDGAR T. WHATLEY.